Dec. 23, 1930.　　　J. B. OLSON　　　1,786,024

POULTRY WATERER

Filed July 18, 1928

INVENTOR.
John B. Olson
BY
Erwin, Wheeler & Woolara
ATTORNEYS.

Patented Dec. 23, 1930

1,786,024

UNITED STATES PATENT OFFICE

JOHN B. OLSON, OF FORT ATKINSON, WISCONSIN, ASSIGNOR TO JAMES MANUFACTURING COMPANY, OF FORT ATKINSON, WISCONSIN, A CORPORATION OF WISCONSIN

POULTRY WATERER

Application filed July 18, 1928. Serial No. 293,645.

This invention relates to improvements in poultry waterers.

The primary object is to reorganize poultry waterers with a view to combining safety in heating, sanitation in use, adaptability for use with fowls of different sizes, convenience in manipulation and cleansing operations, and protection of the water supply and its controlling mechanism.

In the drawings.

Like parts are identified by the same reference characters throughout the several views.

Figure 3:
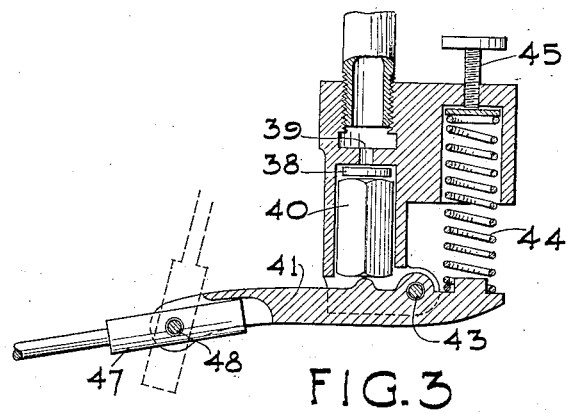
Figure 3 is a detail view of the valve and associated parts.
Figure 2:
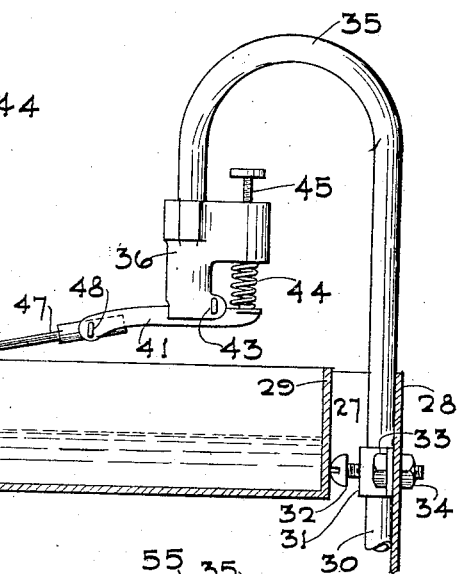
Figure 2 is a fragmentary view on an enlarged scale, showing the water tank in vertical section and the float operated valve mechanism in elevation.
Figure 4:
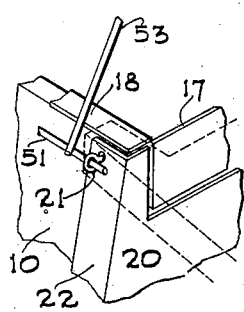
Figure 4 is a fragmentary view of one of the door hinges, one of the cage hinges and associated parts.

An elongated rectangular housing having side walls 10, which preferably converge upwardly, is mounted upon the cross bars 11 of a supporting frame having legs 12 and preferably having longitudinal bars 13 connecting the pairs of legs at the respective ends of the frame and also forming a support to which a set of perch bars 14 may be secured by bolts or screws 16, which pass through the perch bars on one side of their longitudinal center line so that by interchanging the perch bar with that on the other side the perches may be differently spaced from the housing 10. The object of thus differently spacing the perch bars is to provide means whereby the waterers may be adapted for either small or large fowls.

Figure 1:
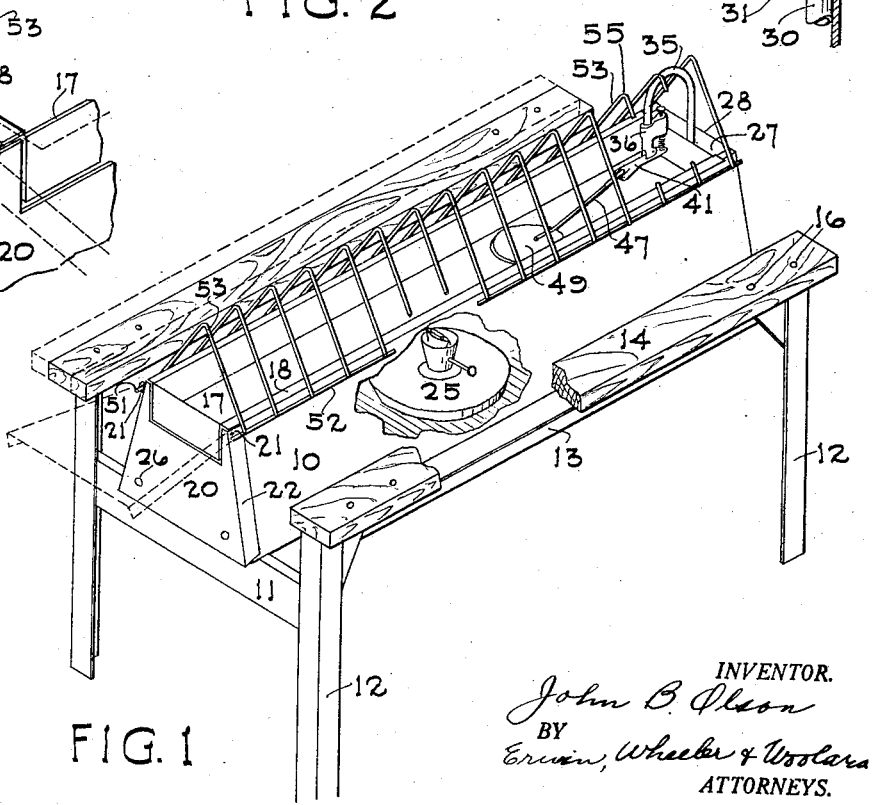
Figure 1 is an isometric view of a poultry waterer embodying my invention, with parts broken away to disclose the heater and also to clearly disclose the improved float operated valve mechanism.

An elongated rectangular water tank 17 is provided with side flanges 18 along the upper margins of its side walls, whereby the tank may be supported from the margins 10 of the side walls, the tank forming the top wall of the housing. At one end of the housing there is a swinging door 20, which has its upper corners hinged at 21 to the upper corners of the side walls 10, the pintle extending through the flanges 22 of the door, which are formed to overlap the ends of the side walls 10, as clearly shown in Figure 1, when the door is closed. The door is opened by swinging it upwardly to the position indicated by dotted lines in said figure, whereupon a heater 25 may be inserted in or removed from, the housing.

The elongated housing makes it possible to insert the heater underneath the central portion of the water tank 17 at a considerable distance from the door 20, and the location of the door hinges 21 is such that the door 20, will swing to a closed position by gravity, thus ensuring a closure of the door when not manually held in an open position. Suitable air inlet apertures 26 may be formed in the door for air circulation and the escape of the gases of combustion are permitted through a flue 27 at the opposite end of the housing, the end wall 28 of which is spaced from the associated end wall 29 of the water tank.

A supply pipe 30 extends upwardly through this space from any suitable source of water supply and is secured to the housing by a bracket or a clamping member 31 and a screw 32, which may serve as a spacer to regulate the size of the flue 27. The screw 32 passes through the bracket at one side of the supply pipe 30 and through the wall 28 of the housing to which it is clamped by the inner and outer clamping nuts 33 and 34.

The supply pipe 30 has its upper end portion reversely curved to form a so-called "goose-neck" 35, which supports a valve casing 36 containing a valve disc 38, which seats against the pressure of water in the port 39 with which the "goose-neck" 35 communicates. The valve actuating plunger 40, preferably square in cross section, is normally lifted by the spring actuated lever 41 to hold the valve in a closed position. The lever 41 is connected with the casing by a fulcrum pin 43 and actuated in a direction to close the valve by a spring 44, the tension of which may be adjusted by the set screw 45. The opposite end of the lever 41 from that upon which the spring bears is recessed on its under side to receive one end of the float supporting arm 47, this arm being pivotally connected to the lever by the pin 48. The other end of the arm is provided with a float 49, which will be normally supported by the water in the water tank 17. When the float is not supported by the water, its weight actuates lever 41 in a direction tending to compress the spring 44, thereby lowering the plunger 40 and allowing the valve disc 38 to open. The upper end of the plunger 40 is rounded and the valve disc is wholly unconnected, so that it tends to move rotatably whenever it is in an open position, due to the eddying of the currents of water which pass around it. The plunger and the valve disc are seated in a cylindrical bore in the valve casing, the disc being of less diameter than the bore, and the plunger contacting with the wall thereof only at its corners so that the water may flow freely into the tank when the valve is open.

A protecting wire cage normally covers the tank 17. This cage is formed of longitudinally extending strands of wire 52, which are adapted to bear against the side walls 10 of the housing and are connected with each other by anti-roost spaced wires 53, each of which has its ends connected with the side wires 51 and 52 of the cage, and the intermediate portions converging upwardly to an apex 55, each of the wires 53 having the form of an inverted V, as clearly shown in Figure 1. The wire 51 will preferably be hinged to the associated housing wall 10, whereby the entire cage may be swung upon the axis of the hinge to uncover the water tank 17 when access is desired to the valve or its float actuated mechanism or to the water tank itself. Ordinarily, however, the water tank will be removed longitudinally for cleansing purposes through the notch in door 20. After manually lifting the float 49 the tank may be thus drawn out and reinserted without danger of closing the flue space 27 at the opposite end, for the reason that the set screw 32 serves as a stop to arrest the movement of the tank when it is being pushed into place. It is important that this flue 27 be open at all times for the reason that the warm air passing through it prevents the water in the supply pipe from freezing. This warm air is distributed over the surfaces of the "gooseneck", so that no packing or other heat retaining jacket will be required for any portion of the pipe, except that portion which extends below the housing for connection with the source of supply.

I claim:

1. A poultry waterer comprising the combination with a supporting frame, of an elongated housing, a trough shaped tank capping the housing and spaced from one end thereof to form an outlet flue, the upper portion of the housing being otherwise substantially closed against the escape of heated air and gases, a heater within the housing and water supply connections for the tank extending vertically through said flue and overhanging the tank adjacent thereto.

2. A poultry waterer comprising the combination with a supporting frame, of an elongated housing, a trough shaped tank capping the housing and spaced from one end thereof to form an outlet flue, a heater within the housing, and water supply connections for the tank extending vertically through said flue, said water supply connections including a float controlled valve outlet having a float normally supported by the water in the tank, and a cage, excluding fowls from access to the float and valve operating mechanism.

3. A poultry waterer comprising the combination with a heater receiving housing, a water tank capping the housing, a cage having wire extending along the sides of the housing and connected by spaced wires which have their central portions bent in the form of an inverted V, a heater in the housing, and an automatically closing end door for the housing permitting access to the heater and also permitting a removal of the water tank when swung to a raised full open position.

4. A poultry waterer comprising the combination with a heater receiving housing, a water tank capping the housing, a cage having wires extending along the sides of the housing, and connected by spaced wires which have their central portions bent in the form of an inverted V, a heater in the housing and an automatically closing end door for the housing permitting access to the heater, also permitting a removal of the water tank when swung to a raised full open position, said door being hinged to the housing at its upper corners and provided with side flanges normally overlapping the side walls of the housing.

5. A poultry waterer comprising the combination with a heater receiving housing, a water tank capping the housing, a heater in the housing, an automatically closing end door for the housing permitting access to the heater and also permitting a removal of the water tank when swung to a raised full open position, and a wire cage normally covering the tank, said cage being hinged to one side wall of the housing and engageable with the other side wall, with its central portions composed wholly of spaced strands of wire, which converge upwardly from the sides of the tank to apices substantially in a central vertical plane through the longitudinal axis of the tank.

6. In a poultry waterer, the combination with a supporting frame, of a heater receiving housing carried by the frame in a raised position, and a water tank carried by the housing, flanked by perches which are interchangeable, supports for said perches and means for connecting the perches, so located that when the perches are interchanged they will necessarily be differently spaced from the housing.

7. In a poultry waterer, the combination with a supporting frame and water supply tank, of a set of perches permitting access by fowls to the water in the tank and connectible with the frame in different laterally spaced positions with reference to the tank, said frame having perch supporting means adapted to permit outward and inward adjustments of the perches thereon.

8. In a poultry waterer provided with a drinking receptacle and a water supply connection, a water supply connection having a freely rotatable disk valve, and float controlled mechanism for normally holding the disk valve to its seat and releasing it when the water supply allows the float to descend below normal level.

JOHN B. OLSON.